United States Patent [19]

Adachi et al.

[11] Patent Number: 5,174,151
[45] Date of Patent: Dec. 29, 1992

[54] APPARATUS FOR MEASURING GROUND-CONTACTING PORTION OF TIRE TREAD

[75] Inventors: Zempachiro Adachi; Yoshio Gouhara, both of Hiratsuka, Japan

[73] Assignee: The Yokohama Rubber Co., Ltd., Tokyo, Japan

[21] Appl. No.: 733,533

[22] Filed: Jul. 22, 1991

[30] Foreign Application Priority Data

Aug. 24, 1990 [JP] Japan ................................. 2-221047

[51] Int. Cl.⁵ .................... B60C 11/03; G01N 17/02
[52] U.S. Cl. ......................................... 73/146; 356/71
[58] Field of Search ............................. 73/146; 356/71

[56] References Cited

U.S. PATENT DOCUMENTS 4,095,464  6/1978  Breedijk ................................. 73/146
5,088,321  2/1992  Kajikawa et al. ..................... 73/146
5,092,166  3/1992  Wada et al. .......................... 73/146

Primary Examiner—Donald O. Woodiel
Attorney, Agent, or Firm—Nikaido, Marmelstein, Murray & Oram

[57] ABSTRACT

This invention discloses an apparatus for measuring the ground-contacting portion of tire tread wherein the tread of the tire is brought into pressure contact with one of the surfaces of a glass sheet into which rays of light are projected from the side edges of the glass sheet and the contact geometry of the tread of the tire with respect to the glass sheet is photographed by a camera from the other surface of the glass sheet. The tire is allowed to move in parallel with the glass surface while rolling along the glass surface and the camera is moved parallel in the same direction as the tire in synchronism with the movement of the tire.

4 Claims, 4 Drawing Sheets

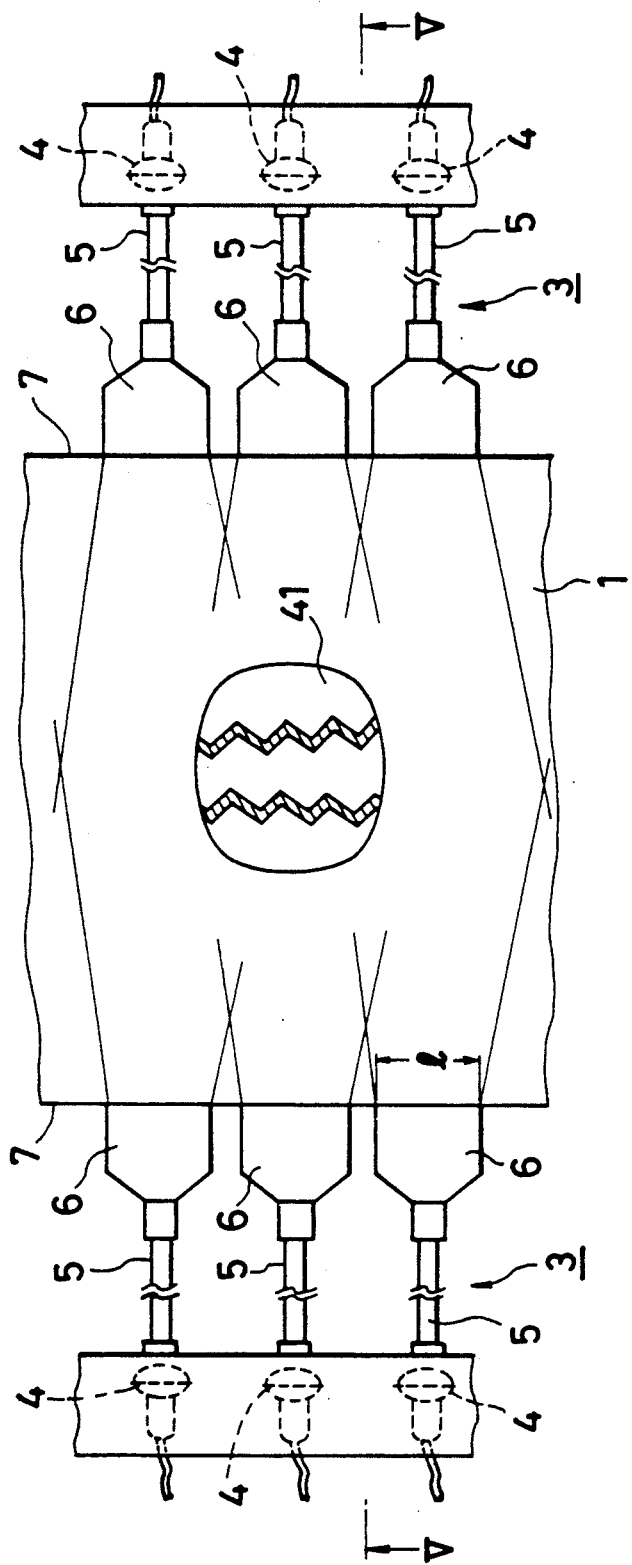
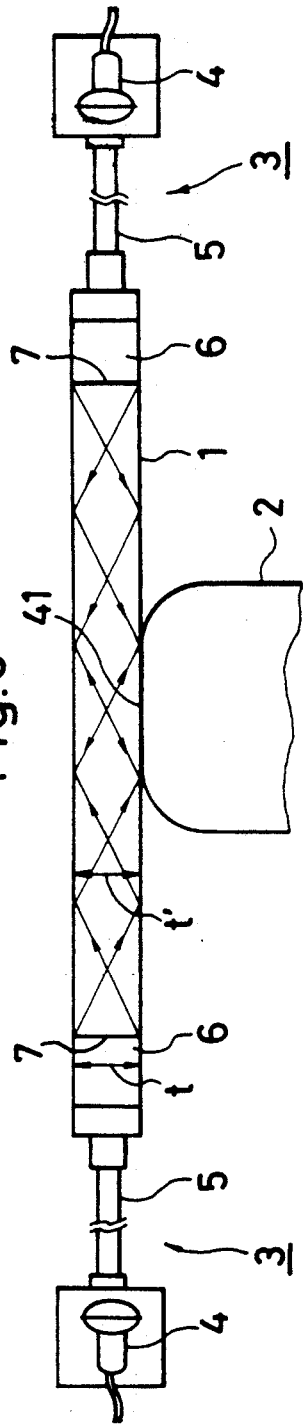

APPARATUS FOR MEASURING GROUND-CONTACTING PORTION OF TIRE TREAD

BACKGROUND OF THE INVENTION

This invention relates to an apparatus for measuring the ground-contacting portion of tire tread. More particularly, the present invention relates to an apparatus for measuring the ground-contacting portion of tread which apparatus measures a contact pressure distribution of tire tread and its behaviour during rolling the the tire.

Generally, a contact pressure distribution and behaviour of the ground-contacting portion of a tire during its rolling change remarkably and complicatedly according to the rotating condition of the tire, its air pressure and load, magnitude and direction of shear force acting on the ground-contacting portion, structural factors of the tire itself, and so forth.

It is therefore very important for the development of tires to find the contact pressure distribution and behaviour during rolling of the tire.

Although conventional measuring apparatuses for tire tread can measure the contact pressure distribution of the ground-contacting portion of a tire while the tire is at half, none of them can measure accurately the contact pressure distribution of the ground-contacting portion of the tire and its behaviour during rolling.

SUMMARY OF THE INVENTION

It is an object of the present invention to provide an apparatus for measuring the ground-contacting portion of tire tread which can measure accurately tire characteristics such as a contact pressure distribution of the ground-contacting portion of the tire and its behaviour during rolling of the tire.

In an apparatus for measuring the ground-contacting portion of tire tread wherein the tread of the tire is brought into pressure contact with one of the surfaces of a glass sheet into which rays of light are projected via side edges of the glass sheet and the contact geometry of the tread of the tire with respect to the glass sheet is photographed by a camera from the other surface of the glass sheet, the apparatus in accordance with the present invention is characterized in that the tire is allowed to move parallel while rolling along the glass surface and the camera is allowed to move parallel in the same direction as the tire in synchronism with the movement of the tire.

Since the camera is moved in the same direction as the tire in synchronism with the movement of the tire, the camera can be kept always opposed to the tire without changing their relative positions and photographing can be made while keeping the same relative positions. Accordingly, an input to the camera does not have any error with time resulting from the change of brightness due to changed relative position and characteristics of the tire during its rolling can be measured at a high level of accuracy.

It is preferred that the moving range of the tire be greater than that of the camera and the camera is moved in the same direction and at the same speed as, and in parallel with, the tire in synchronism with the tire when the center of the visual field of the camera is aligned with the center of the ground-contacting portion of the tire.

Preferably, the image of the tire ground-contacting portion taken by the camera is analyzed by an image processor and the result of this analysis is displayed as a contact pressure distribution image on a color monitor.

Furthermore, a projector disposed at each side edge of the glass sheet comprises preferably condenser lenses whose beam projection surface facing the side edge of the glass sheet is rectangular and whose shorter side has a thickness substantially equal to the thickness of the glass sheet, light sources and optical fiber cables for connecting the condenser lenses to the light sources.

BRIEF DESCRIPTION OF THE DRAWINGS

FIG. 4 is a plan view of a projector in the apparatus for measuring a tread ground-contacting portion in accordance with the present invention; and FIG. 5 is a sectional view taken along line V—V of FIG. 4.

DESCRIPTION OF THE PREFERRED EMBODIMENTS

Hereinafter, preferred embodiments of the present invention will be explained in detail with reference to the accompanying drawings.

Figure 2:
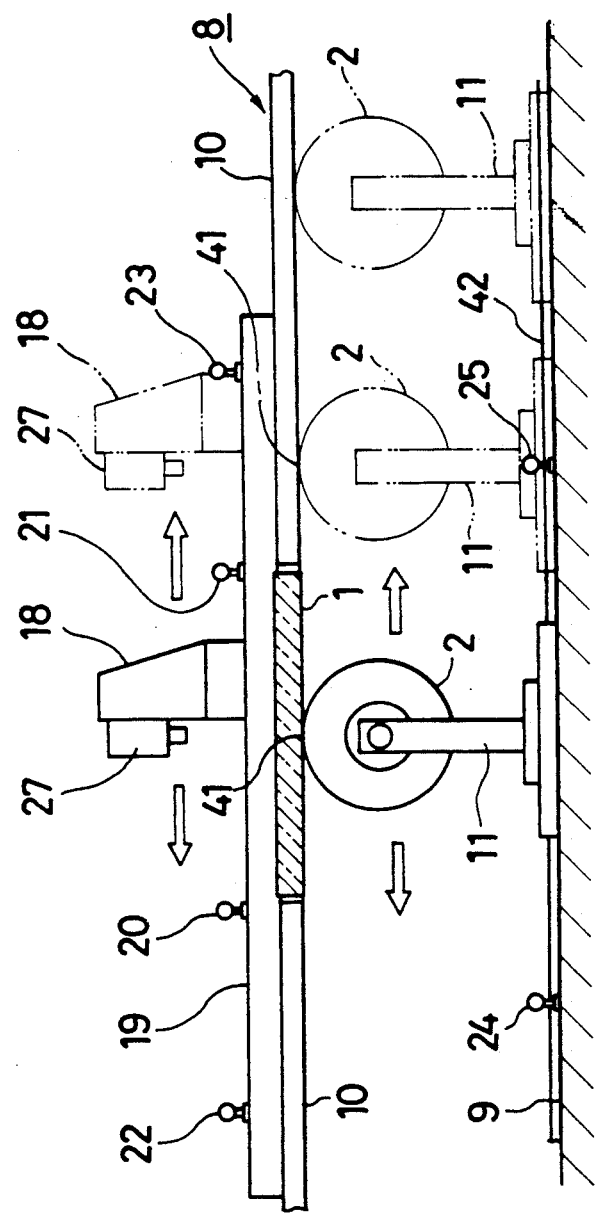
FIGS. 2 and 3 are explanatory views useful for explaining the principle of the apparatus for measuring a tread ground-contacting portion of a tire in accordance with the present invention.
Figure 3:
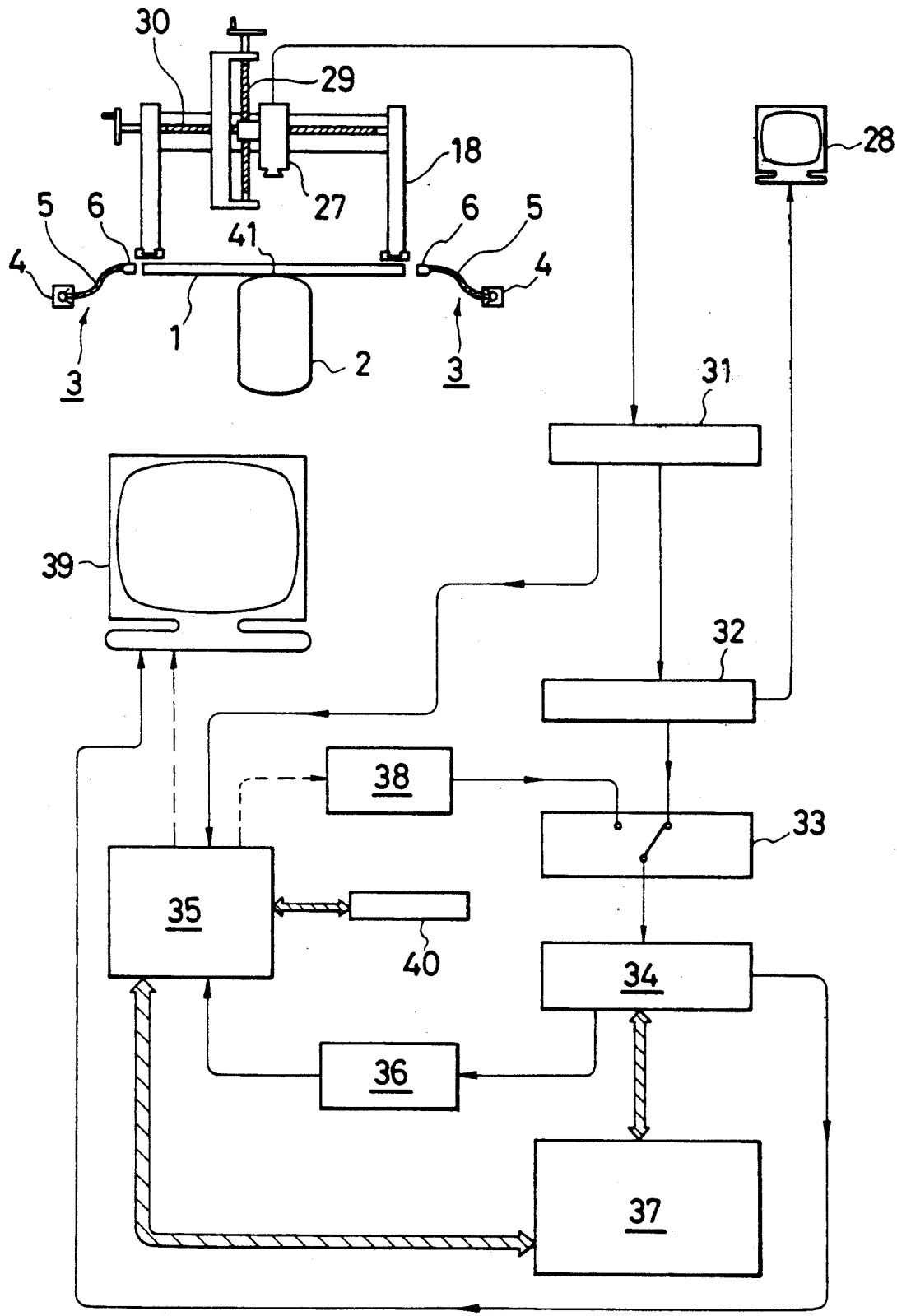

FIGS. 2 and 3 show the principle of the present invention. Reference numeral 1 in FIG. 2 represents a glass sheet consisting of reinforced glass. This glass sheet 1 is rectangular in shape and has a suitable thickness. A tire 2 is allowed to roll when it is moved in parallel with the glass sheet 1 while its tread is being brought into pressure contact with the lower surface of the glass sheet 1.

Projectors 3 are disposed at both opposed end portions of this glass sheet 1 as shown in FIG. 3 so that rays of light are allowed to be incident from the side edges to the inside of the glass sheet 1. A camera 27 for photographing the contact geometry of the tire 2 with respect to the glass sheet 1 is disposed on the opposite side of the glass sheet 1, that is, on the side of its upper surface. The camera 27 is adapted in such a manner as to move in parallel and in synchronism with the tire 2 while the center of the visual field of the camera is aligned with the center of the ground-contacting portion of the tire 2.

As shown in FIG. 2, the camera 27 disposed above the glass sheet 1 moves with a camera mount 18 only within a limited area covering the glass sheet 1. However, the tire 2 that is disposed below the glass sheet 1 is allowed to reciprocate with a tire mount 11 over a longer distance than does the camera 27. A left-side finish limit switch 20 and a right-side finish limit switch 21 are disposed on a frame 19 to which the camera mount 18 is mounted so as to synchronize this camera 27 with the tire 2, in such a manner as to interpose the glass sheet 1 between them in the moving direction of the camera 27. A left-end limit switch 22 and right-end limit switch 23 are further disposed outside these limit switches 20 and 21, respectively. A left-side start limit switch 24 and a right-side start limit switch 25 that correspond to the left-end and right-end limit switches 22, 23 are disposed on the floor 9, respectively, and the camera mount 18 moves at the same speed and in the same direction as the tire mount 11 in synchronism with this tire mount 11. Synchronization control of the camera mount 18 and the tire mount 11 is effected by a synchronization/asynchronization change-over switch (not shown).

The position of the camera 27 fitted to the camera fitting table 18 can be set in advance manually in both vertical and transverse (mounting table width-wise direction) directions as shown in FIG. 3. In this manner, positioning of the camera 27 is carried out by rotating manually a screw shaft 29 in a vertical direction or a screw shaft 30 in a transversely direction each being disposed in the camera mount 18, while watching the image of the ground-contacting portion of the tire on the screen of a camera adjust monitor television 28. An industrial television camera having 527 scanning lines and capable of shooting a frame/0.2 sec, for example, can be used as the camera 27 and the frame interval in this case can be changed arbitrarily in accordance with the contact length of the tire.

The image of the tire ground-contacting portion taken by this camera 27 is recorded in a video tape recorder 34 through a camera controller 31, a video signal distributor 32 and a video camera selector 33. The image of the tire ground-contacting portion recorded in the video tape recorder 34 is sent to an image processor 35 from the video tape recorder 34 through a time base collector 36 when the video camera selector 33 is changed over to the image processor 35. Thereafter, analysis of the pressure distribution of the tire ground-contacting portion is effected in accordance with the instruction from a personal computer 37. Then, the image is converted to a pseudo-color by the image processor 35 in accordance with the degree of the pressure, is converted to a video signal by a color encoder 38 and is recorded in the video tape recorder 34. The tire contact pressure distribution image which is colored in accordance with the degree of the contact pressures of the tire is displayed on a color monitor 39, whenever desired. The image of the tire ground-contacting portion is also displayed simultaneously on the camera adjust monitor 28 through the camera controller 31 and the video signal distributor 32. Reference numeral 40 in the drawings represents a digitizer.

In the explanation given above, the image of the tire ground-contacting portion taken by the camera 27 is recorded in the video tape recorder 34 and is then sent to the image processor 35. In order to further improve image quality, however, it is possible to directly send the image of the tire ground-contacting portion taken by the camera 27 to the image processor 35 without recording it onto the video tape recorder 34.

On the other hand, as shown in FIGS. 4 and 5, each projector 3 comprises a halogen lamp 4, optical fiber cables 5 formed by bundling some dozens to some hundreds of optical fibers and condenser lenses whose beam projection surface opposing to the side edge of the glass sheet 1 is rectangular in shape and the thickness t of the shorter side of which is substantially equal to the thickness t' of the glass sheet 1. Moreover, a large number of condenser lenses 6 are disposed in such a manner as to face the side edge portion of the glass sheet 1 in parallel with the side edge surface 7 of the glass sheet 1 and as densely as possible. According to this structure, the rays of light emitted from the halogen lamp 4 can be projected into the glass sheet 1 with uniform brightness throughout the entire portions through the optical fiber cables 5 and the condenser lenses 6 as parallel rays of light. Symbol l in the drawing represents the length of the longer side of each condenser lens 6.

The halogen lamp 4 as the light source is not disposed directly at the side edge of the glass sheet 1 in order to prevent the glass sheet 1 from being heated and distorted or to prevent the occurrence of peel at a joint portion in the case of a laminated glass sheet by the heat of the halogen lamp.

Figure 1:
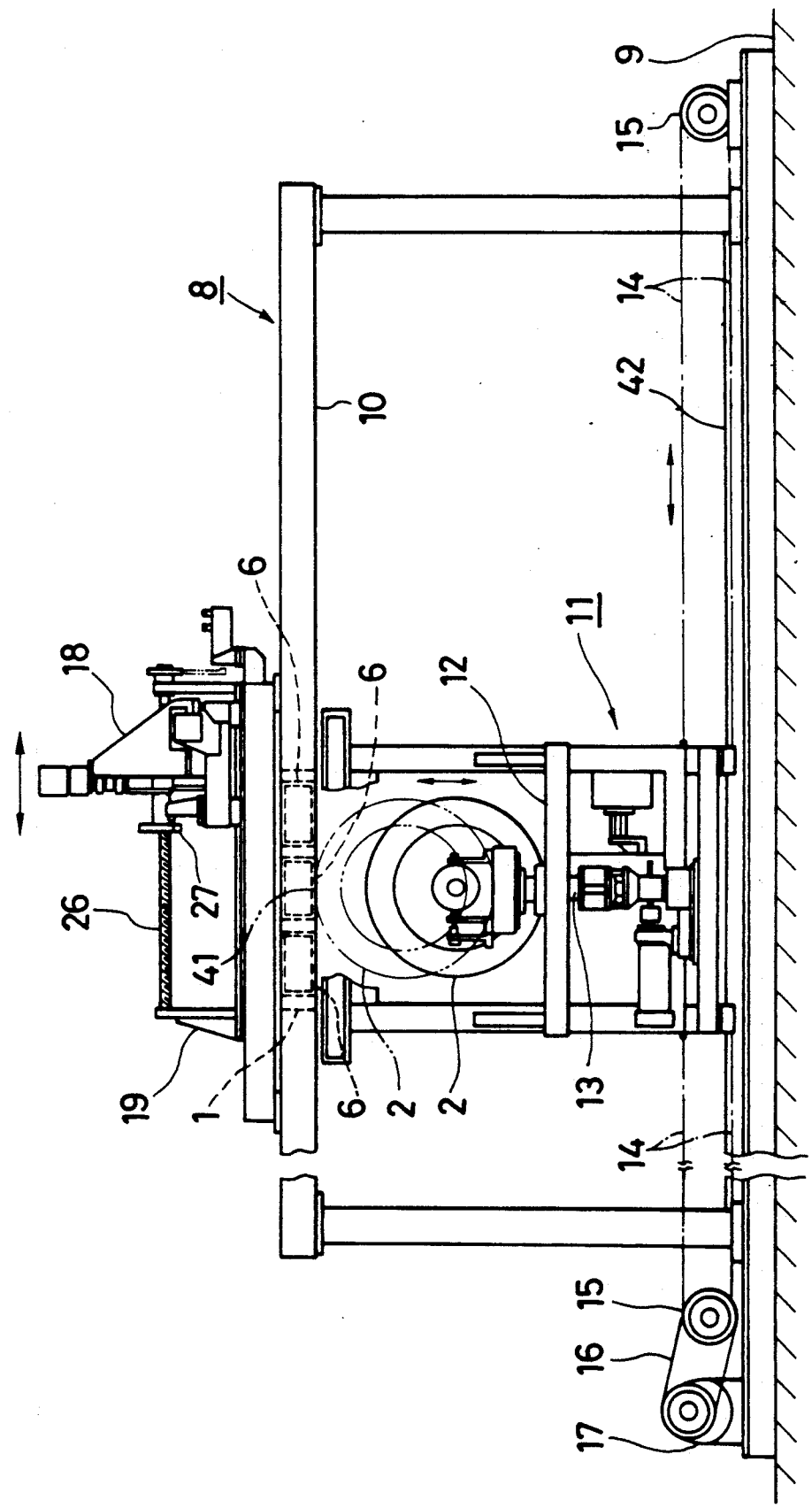
FIG. 1 is a front view of an apparatus for measuring a tread ground-contacting portion of a tire in accordance with the present invention.

FIG. 1 shows an apparatus which embodies the principle of the measuring apparatus of the present invention described above.

Reference numeral 8 represents a stand disposed on the floor 9. The afore-mentioned glass sheet 1 and projectors (not shown) are disposed at the center of a top plate 10 of this stand 8. The top plate 10 and the lower surface of the glass sheet 1 define the same horizontal plane so that any change of the contact pressure of the tire 2 does not occur when the tire 2 moves from the top plate 10 to the glass sheet 1. Two rails 42 are laid down in parallel with the stand 8 on the floor 9 facing the top plate 10 and the tire mount 11 travels on these rails 42. The tire mounting portion 12 is fitted to this tire mount 11 in such a manner as to be capable of moving up and down and the tire 2 is fitted rotatably to the tire mounting portion 12. The screw shaft 13 implanted to the tire mount 11 meshes with the tire mounting portion 12. When this screw shaft 13 is rotated in a predetermined direction, the tire mounting portion 12 is moved up along the tire mount 11 and the tire 2 is pushed to the top plate 10 with a predetermined load. An endless belt 14 equipped with teeth is interconnected to the tire mount 11. This toothed belt 14 is wound on a pair of toothed pullies 15. When one of these toothed pullies 15 is driven by a reversible motor 17 through the toothed belt 16, the tire mount table 11 is moved to the right or left in the drawing. Thus, the tire 2 fitted rotatably to the tire mount 11 rolls while its tread is being pushed to the top plate 10 and to the glass sheet 1 with a predetermined load.

On the other hand, the camera mount 18 moving in the longitudinal direction of the stand 8 in synchronism with the tire mount 11 is disposed on the stand 8.

The screw shaft 26 is disposed in the frame 19 fixed onto the stand 8 and the camera mount 18 meshes with this screw shaft 26. Accordingly, when this screw shaft 26 is rotated, the camera mount 18 can be moved in the longitudinal direction of the stand 8 at the same speed as the tire mount 11.

The measuring apparatus having the construction described above is disposed and used inside a room capable of shielding external light.

Next, the operation of the measuring apparatus described above will be explained.

To begin with, when each projector 3 is turned ON, the rays of light emitted from the halogen lamp 4 are converted to parallel luminous fluxes by the optical fiber cables 5 and the condenser lenses 6 and are projected into the glass sheet 1 via opposite side edges of the glass sheet 1.

On the other hand, the afore-mentioned tire mount 11 and camera mount 18 are at their standby positions on the right side of the stand 8 as shown in FIG. 2 (home positioning). Next, when the motor 17 for driving the tire mount is turned ON, the tire mount 11 moves from the right end to the left end of the stand 8. When the tire mount 11 turns ON the right start limit switch 25, the camera mount 18 moves to the left side of the stand 8 at the same speed as the tire mount 11. As a result, the camera 27 on the camera mount 11 takes the image of the ground-contacting portion 41 of the tire at a rate of one frame per 0.2 sec while the tire 2 is being pushed to the glass sheet 1 and is rolling. The image of the tire ground-contacting portion 41 taken by this camera 27 is recorded into the afore-mentioned video tape recorder 34. The image of the tire ground-contacting portion 41 thus recorded onto the video tape recorder 34 is image-processed by the image processor 35 and is then displayed on the color monitor 39.

When the camera mount 18 turns ON the leftside finish limit switch 20, both the camera mount 18 and tire mount 11 stop. Thereafter, the camera mount 18 and the tire mount 11 are returned to the right side of the stand 8 for home-positioning.

When the tire mount 11 and the camera mount 18 move relative to one another while the tire 2 is being pushed to the top plate 10 with a predetermined pressure as described above, the parallel rays are projected into the glass sheet 1 at angles not exceeding a critical angle and are totally reflected at the portion where the tread of the tire 2 is not in contact with the lower surface of the glass sheet 1, and provide a (dark) image. At the ground-contacting portion where the tread of the tire is in contact with the lower surface of the glass sheet 1, however, the rays of light are absorbed and the portion becomes bright, so that the ground-contacting portion 41 of the tire becomes a bright (white) image and is displayed clearly. In this case, brightness of the ground-contacting portion differs according to the degree of the contact pressrue. Accordingly, when image processing is made by the image processor 35, the contact pressure distribution of the tire ground-contacting portion 41 can be displayed visually in colors.

Moreover, since the tire mount 11 and the camera mount 18 move relatively and in synchronism with each other, they do not involve deviation of the image of the tire ground-contacting portion 41 and imaging can be made as if the tire ground-contacting portion 41 were under the stationary state.

What is claimed is:

1. An apparatus for measuring the ground-contacting portion of tire tread, comprising:

a travelling path for rolling a tire thereon, said travelling path including a glass sheet having a tire contacting surface thereon;

tire mounting means for mounting a tire thereon, said tire mounting means being movable in a rolling direction to contact the tire on said travelling path;

projector means for projecting rays of light, said projector means being disposed on at least one side edge of said glass sheet;

a camera for capturing an image of said tire tread, said camera disposed on an opposite side of said travelling path from said tire mounting means;

means for moving said camera in synchronization with the tire mounting means in the rolling direction parallel to said tire mounting means;

wherein said tire mounting means moves said tire to roll along said travelling path together with said camera while said projector means projects rays of light into said glass sheet.

2. An apparatus as recited in claim 1, wherein a moving range of said tire mounting means is greater than a moving range of said camera, and said camera moves in parallel in a same direction in synchronism with said tire, when a center of a visual field of said camera is aligned with a center of the ground-contacting portion of said tire.

3. An apparatus as recited in claim 1, further comprising:

image processor means coupled to said camera, said image processor means for analyzing an image of said ground contacting portion of said tire tread generated by said camera, and display means coupled to said image processor means for displaying a contact pressure distribution image of said tire.

4. An apparatus as recited in claim 1, wherein said projector means comprises at least one condenser lens having a beam projection surface thereon, said beam projection surface facing said side edge of said glass sheet, said beam projection surface having a rectangular shape with longer sides and shorter sides, said shorter sides having a thickness substantially equal to a thickness of said glass sheet, said projector means further comprising light sources for generating light therefrom, and optical fiber cables for connecting said at least one condenser lens to said light sources.

* * * * *